No. 612,054. Patented Oct. 11, 1898.
R. PIPER.
BICYCLE TIRE.
(Application filed Feb. 3, 1898.)
(No Model.)
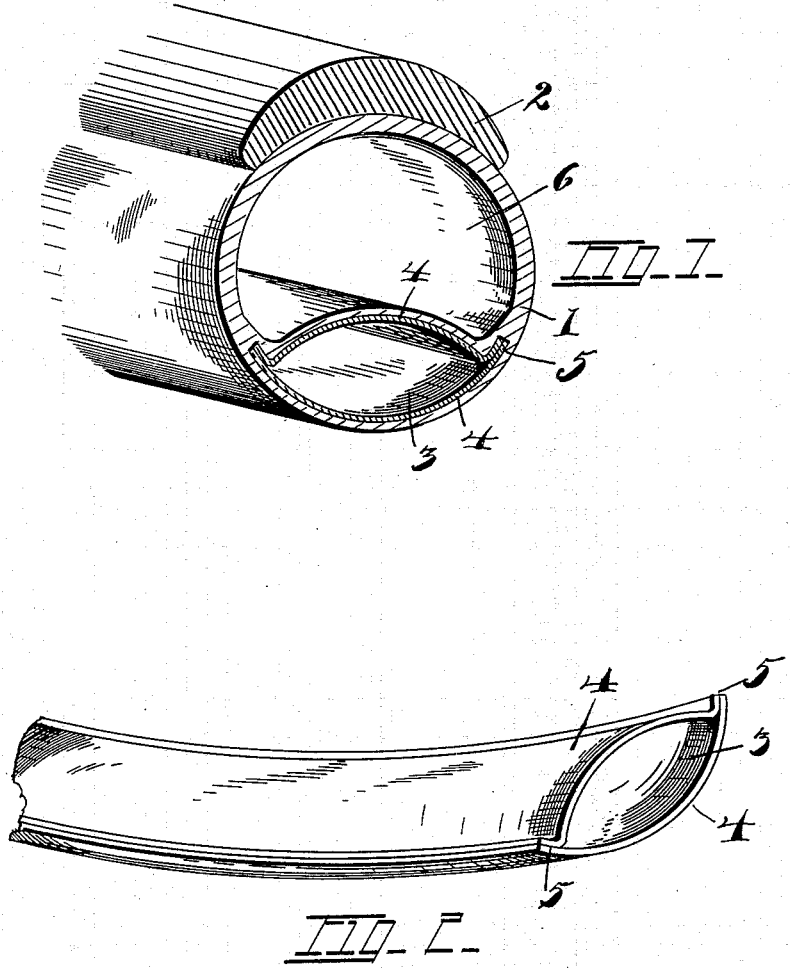

UNITED STATES PATENT OFFICE.

ROBERT PIPER, OF TOLEDO, OHIO.

BICYCLE-TIRE.

SPECIFICATION forming part of Letters Patent No. 612,054, dated October 11, 1898.

Application filed February 3, 1896. Serial No. 577,829. (No model.)

*To all whom it may concern:*

Be it known that I, ROBERT PIPER, of Toledo, county of Lucas, and State of Ohio, have invented certain new and useful Improvements in Bicycle-Tires; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a bicycle-tire, and has for its object to provide, in connection with a pneumatic tire, a cushioned non-puncturable tread portion.

The invention therefore consists in a tire having two concentric compartments, the inner or air compartment, inflatable by the ordinary air-pump, and an outer chamber having located therein a compressible metallic chamber, said chamber being substantially elliptical in cross-section and formed of two plates secured together at their edges, whereby the outer plate curves coincidently with the curve of the tread portion of the tire and depresses inwardly toward the center of the wheel, due to pressure thereon.

The invention further consists in the parts as hereinafter shown, described, and claimed.

In the drawings, Figure 1 is an end view of a tire, illustrating the two compartments and the elliptical metallic chamber located in the outer compartment; and Fig. 2 is an elevation of the metallic chamber.

1 designates the tire secured in any preferred manner to the felly 2. The tire is hollow in cross-section and is provided with a diaphragm 1', dividing the tire into two compartments—an inner air-compartment 6 and an outer concentric compartment, in which is located a metallic chamber 3. Chamber 3 is comprised of two plates 4, each in the form of an arc of a circle, and when joined and secured together at their meeting edges 5 by brazing, welding, or soldering form a chamber which is elliptical in cross-section. By the peculiar form of the chamber 3 the chamber occupies only a small portion of the interior of the tire, and the outer plate 4 coincides with the entire tread portion of the tire.

It will be readily seen that the air within the compartment 6 cushions the chamber 3 and that the chamber 3 not only serves as a means to prevent puncture, but by its elliptical form in cross-section receives the initial jar and aids the air-cushion to prevent the jar being transmitted to the bicycle.

If desired, instead of forming the chamber 3 of two metal plates one plate may be used, bent upon its surface and the two edges secured together, it being understood that the plate so bent presents an elliptical form in cross-section similar to that shown in the drawings.

What I claim is—

A flexible bicycle-tire having a diaphragm extending across the same, dividing the interior thereof into two concentric compartments, forming an inner air-chamber, and an outer chamber, a metallic tube located in the outer compartment, said tube to be specially elliptical in cross-section and formed of two plates, an outer plate coinciding with the tread of the tire, and an inner plate having side flanges coinciding with the tread of the tire, and means for securing the flanges to the edge of the outer plate, the whole providing the tire with an inner pneumatic chamber, and an outer resilient metallic chamber substantially as described.

In testimony that I claim the foregoing as my own I hereby affix my signature in presence of two witnesses.

ROBERT PIPER.

Witnesses:
WILLIAM WEBSTER,
MAUD SCHUMACHER.